(12) United States Patent
Kawamura et al.

(10) Patent No.: US 10,381,969 B2
(45) Date of Patent: Aug. 13, 2019

(54) CONTROL DEVICE AND CONTROL METHOD

(71) Applicant: CANON KABUSHIKI KAISHA, Tokyo (JP)

(72) Inventors: Koji Kawamura, Yokohama (JP); Jumpei Ashida, Kawasaki (JP); Shigeru Kameyama, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/906,245

(22) Filed: Feb. 27, 2018

(65) Prior Publication Data
US 2018/0254733 A1   Sep. 6, 2018

(30) Foreign Application Priority Data

Mar. 1, 2017   (JP) ................. 2017-038680

(51) Int. Cl.
| H02P 27/12 | (2006.01) |
| H02P 21/18 | (2016.01) |
| H02P 21/22 | (2016.01) |
| H02P 6/18  | (2016.01) |
| H02P 6/28  | (2016.01) |

(52) U.S. Cl.
CPC ............... *H02P 27/12* (2013.01); *H02P 6/18* (2013.01); *H02P 6/28* (2016.02); *H02P 21/18* (2016.02); *H02P 21/22* (2016.02); *H02P 2203/09* (2013.01)

(58) Field of Classification Search
CPC .................................. H02P 6/182; H02P 6/15
See application file for complete search history.

(56) References Cited

U.S. PATENT DOCUMENTS

| 2010/0181953 A1* | 7/2010 | Cheng ..................... H02P 6/085 318/400.35 |
| 2017/0222580 A1* | 8/2017 | Tsai ........................ H02P 7/285 |

FOREIGN PATENT DOCUMENTS

JP      2008048504 A    2/2008

* cited by examiner

*Primary Examiner* — Karen Masih
(74) *Attorney, Agent, or Firm* — Rossi, Kimms & McDowell LLP (57) ABSTRACT

A control device comprises a driving unit configured to drive a plurality of coils of a multiple-phase motor by pulse width modulation; a detection unit configured to detect currents flowing through the plurality of coils in a time-division manner; and a change unit configured to change, in accordance with a duty in the pulse width modulation, a sequence of detecting the currents flowing through the plurality of coils by the detection unit.

15 Claims, 9 Drawing Sheets

CONTROL DEVICE AND CONTROL METHOD

BACKGROUND OF THE INVENTION

Field of the Invention

The present invention relates to a control device and a control method.

Description of the Related Art

A three-phase brushless motor is known as one type of three-phase (a U phase, a V phase, and a W phase) motor. The three-phase brushless motor free from wear of brush is high in durability and widely used. In a general three-phase brushless motor, a rotation torque is generated by supplying a three-phase AC current to a three-phase coil. In recent years, it is possible to implement improvements in quietness and driving efficiency by performing current-drive control using a sine wave. Furthermore, vector control of controlling the amplitude and phase of a three-phase sinusoidal current precisely is becoming quite common.

In this vector control, the three-phase brushless motor is driven by pulse width modulation (to be referred to as PWM hereinafter) in which a switching element of an inverter undergoes an ON/OFF operation based on an instruction voltage for each phase. In the vector control, it is important to accurately detect currents flowing through three phases, respectively.

In general, a current sensor is used as a sensor that detects each of the currents flowing through the three phases. However, the current sensor is expensive, and thus not suitable for an embedded motor control device. Accordingly, in recent years, a method of using a shunt resistor connected in series with each switching element on an L side of an inverter and estimating each of the currents flowing through three phases from a voltage between terminals is used (see, for example, Japanese Patent Laid-Open No. 2008-48504).

In the method described in Japanese Patent Laid-Open No. 2008-48504, a PWM driving pattern in which a current flows through only one phase out of three phases is driven sequentially, and a current value is obtained from a voltage applied to the corresponding shunt resistor at that time. In such an arrangement, there is a restriction that the current value can be measured accurately only in a period during which the switching element on the L side is ON (period during which PWM is Low).

SUMMARY OF THE INVENTION

Consider a case in which one A/D converter changes channels in sequence of a U phase, a V phase, and a W phase and detects current values with respect to three shunt resistors. Depending on a PWM driving pattern, an ON period of a switching element becomes comparatively short in a certain phase. In this case, if the current of this phase is detected at the last in sequence, a case may occur in which current detection cannot be completed while the switching element is ON. That is, a case may occur in which a wrong current value (a current value when the switching element is not ON) is measured. Alternatively, the PWM driving pattern needs to be restricted so as not to cause such a case.

An aspect of the present invention provides a motor control technique capable of suppressing or removing a failure in current detection.

An aspect of the present invention includes the following arrangement. A control device, comprising: a driving unit configured to drive a plurality of coils of a multiple-phase motor by pulse width modulation; a detection unit configured to detect currents flowing through the plurality of coils in a time-division manner; and a change unit configured to change, in accordance with a duty in the pulse width modulation, a sequence of detecting the currents flowing through the plurality of coils by the detection unit.

According to an exemplary aspect of the present invention, it is possible to provide the motor control technique capable of suppressing or removing the failure in current detection.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will now be described with reference to the accompanying drawings. However, the embodiments of the present invention are not limited to the following embodiments. The same or similar constituent elements, members, processes, and signals shown in the drawings are denoted by the same reference numerals, and a repetitive description thereof will appropriately be omitted. In the drawings, some members that are not important for the description are not illustrated. In addition, symbols representing a voltage and a current may be used as symbols that represent a voltage value and a current value, respectively, as needed.

First, a problem concerning control of a PWM driving three-phase motor that changes channels in sequence of a U phase, a V phase, and a W phase and detects current values by one A/D converter with respect to three shunt resistors will be described with reference to FIGS. 1 and 2.

Figure 1:
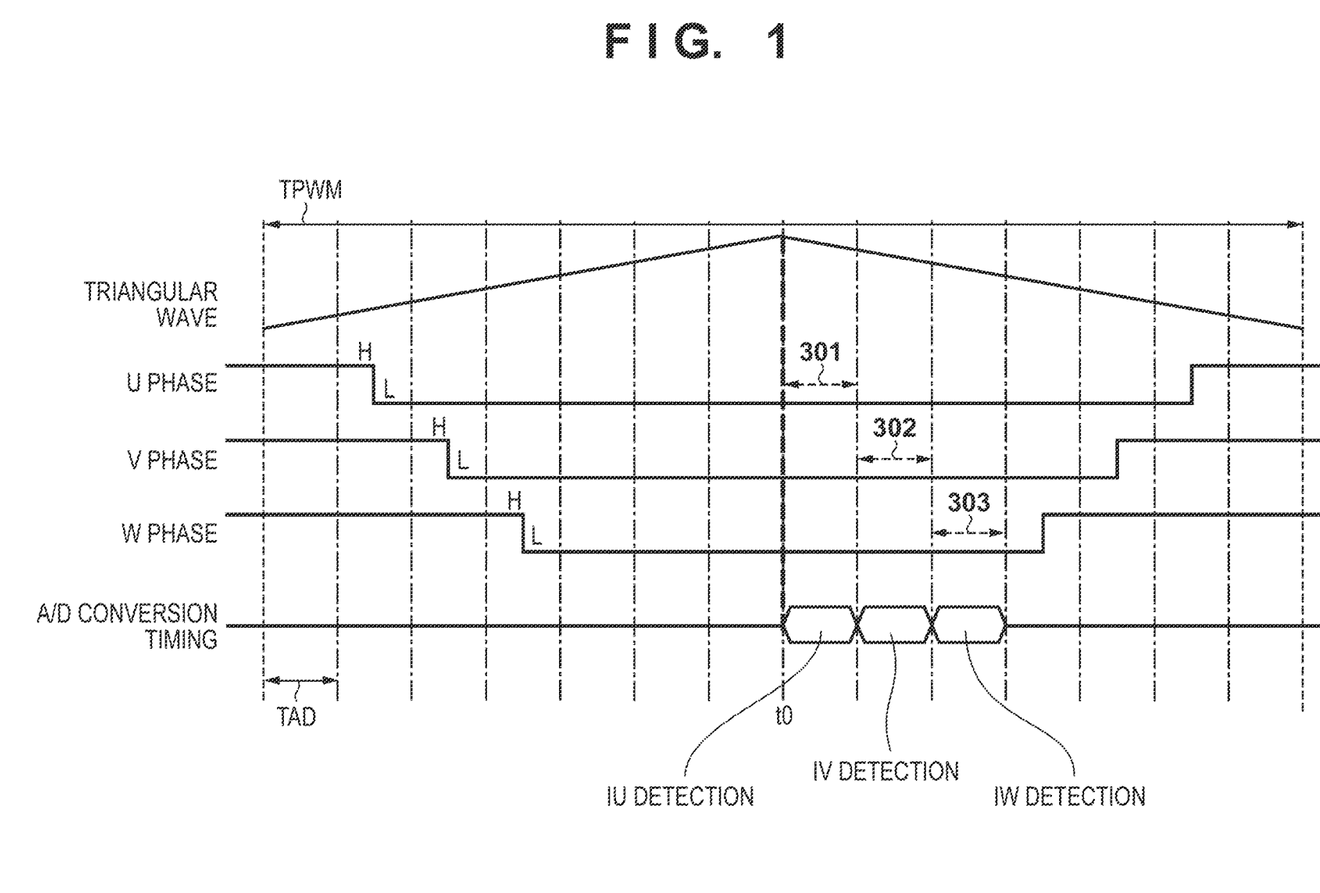
FIG. 1 is a timing chart showing a relationship between a period in which a current flows through each phase coil of a three-phase motor and a timing of conversion by an A/D converter.

FIG. 1 is a timing chart showing a relationship between a period in which a current flows through each phase coil of the three-phase motor and a timing of conversion by the A/D converter. In FIG. 1, a "triangular wave" indicates a counter value of a PWM counter (not shown) used for PWM control in the form of a waveform. A PWM waveform of each phase is generated by comparing this counter value with an instruction value from PI control. A PWM cycle will be referred to as TPWM. A "U phase", a "V phase", and a "W phase" are the waveforms of a U-phase control signal, a V-phase control signal, and a W-phase control signal that control FETs on the L sides (low sides) of the U-phase, V-phase, and W-phase coils, respectively. When the U-phase control signal is at L level, the FET on the low side is turned on, and the current flows through the U-phase coil. The same also applies to the V-phase control signal and the W-phase control signal. An "A/D conversion timing" refers to a timing of conversion by the A/D converter.

At time t0 corresponding to the peak of the triangular wave, all the FETs on the three L sides are turned on. Accordingly, the A/D converter starts a series of current detection operations using the time t0 as a reference. The A/D converter performs A/D conversion in sequence of U-phase current detection 301, V-phase current detection 302, and W-phase current detection 303 from the time t0. Let N μs be a sampling cycle TAD of A/D conversion, at least (3×N) μs is needed to measure all the current values of the three phases.

Figure 2:
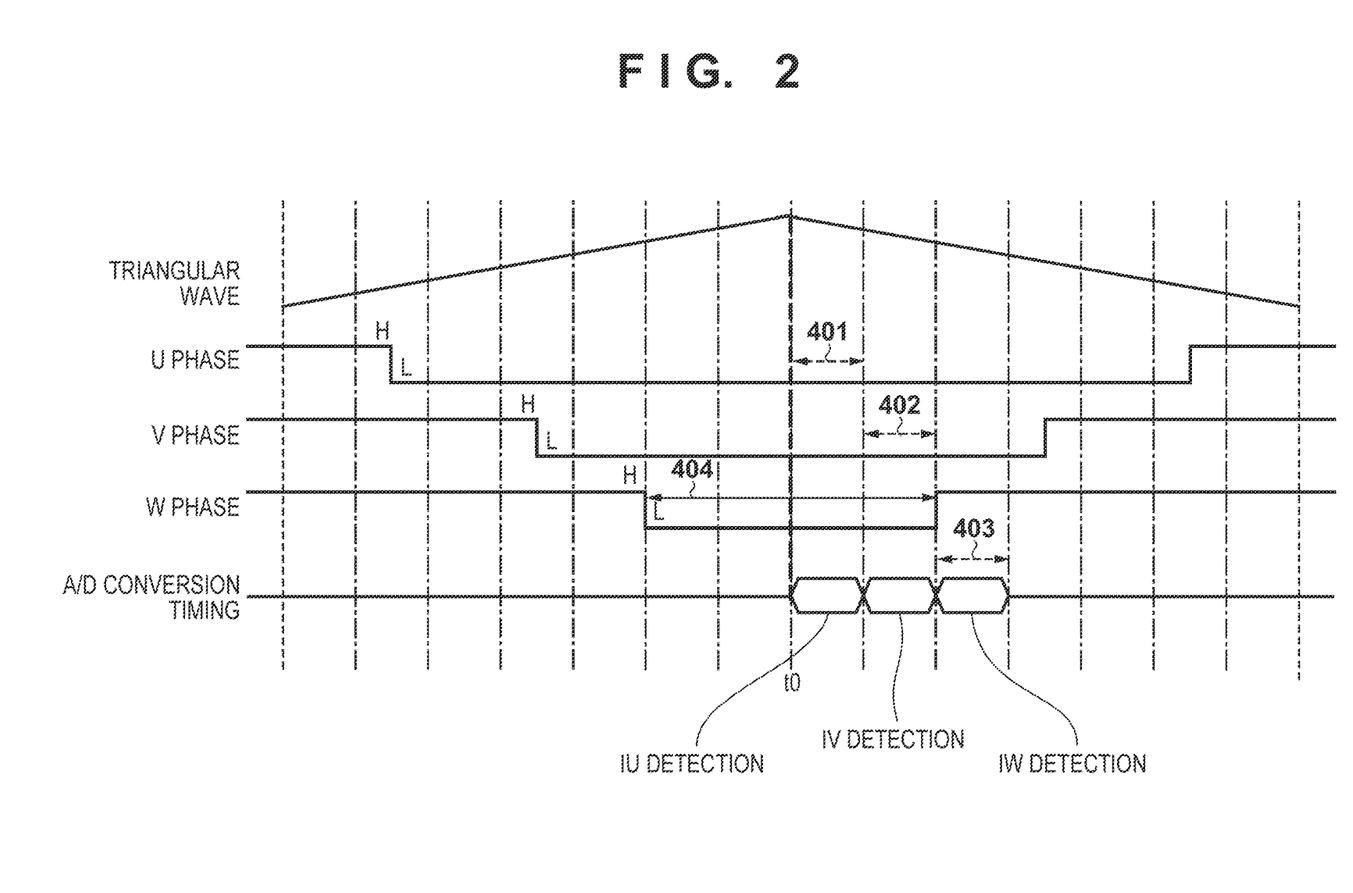
FIG. 2 is a timing chart showing the relationship between the period in which the current flows through each phase coil of the three-phase motor and the timing of conversion by the A/D converter.

FIG. 2 is a timing chart showing the relationship between the period in which the current flows through each phase coil of the three-phase motor and the timing of conversion by the A/D converter. In FIG. 2, a case higher in PWM duty (shorter in Low period) than in FIG. 1 will be described. In FIG. 2, although nothing is wrong with U-phase current detection 401 and V-phase current detection 402, W-phase current detection 403 falls outside a period 404 of the W phase at L level (a period in which the FET on the L side of the W phase is ON). That is, in this case, the W-phase current detection 403 is performed in a state in which the FET on the L side of the W phase is OFF, making it impossible to perform current detection accurately. Such a problem arises if the length of a period from a timing (the time t0 or the peak of the triangular wave) to start the A/D conversion to a change of the W-phase control signal to H level is equal to or less than (3×N) μs. This condition is likely to be satisfied for a motor having a high rotation speed, in particular, a case in which the PWM cycle TPWM is 100 times or less, 50 times or less, 20 times or less, or 10 times or less the sampling cycle TAD of the A/D conversion.

Therefore, a control device according to the embodiment changes the current detection sequence in accordance with the PWM duty of the control signal for each phase. This makes it possible to suppress or remove a failure in current detection even in a case in which the rotation speed of the motor and the sampling cycle of the A/D converter are comparatively close to each other.

(First Embodiment)

Figure 3:
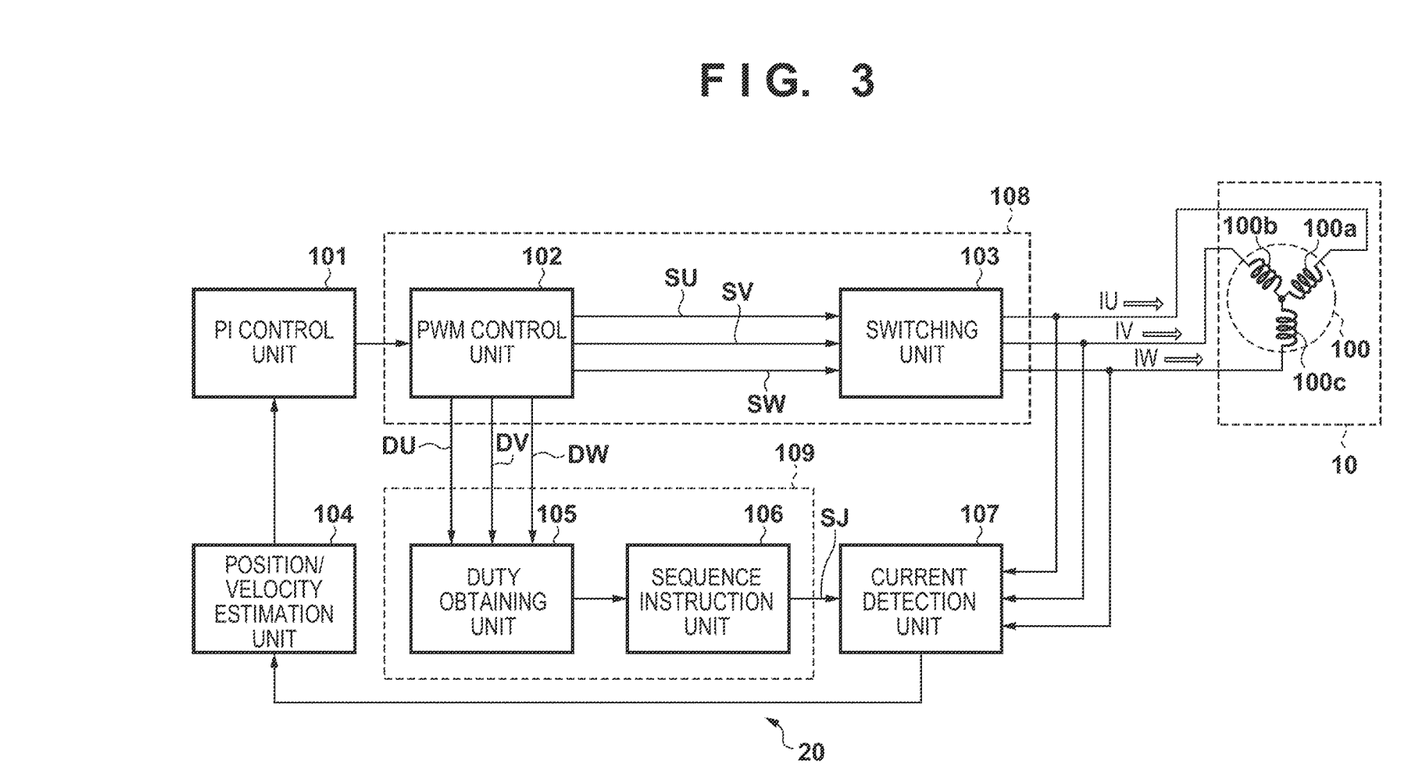
FIG. 3 is a block diagram showing the functions and arrangements of a control device and a three-phase motor controlled by it according to the first embodiment.

FIG. 3 is a block diagram showing the functions and arrangements of a control device 20 and a three-phase motor 10 controlled by it according to the first embodiment. Each block of the control device 20 shown here can be implemented as hardware by an element or a machine device such as a CPU of a computer and can be implemented as software by a computer program or the like. However, a functional block implemented by cooperation between them is illustrated here. Therefore, those who are skilled in the art and who read this specification understand that these functional blocks can be implemented in various ways by a combination of hardware and software.

The three-phase motor 10 is a three-phase brushless motor, and includes a three-phase coil 100 and other members such as a rotor and a stator (neither is shown). The three-phase coil 100 includes a U-phase coil 100a, a V-phase coil 100b, and a W-phase coil 100c. In FIG. 3, each of the coils 100a, 100b, and 100c is illustrated as one coil. However, this includes a case in which there is actually one coil and a case in which one coil representative of a plurality of in-phase coils is illustrated.

The control device 20 performs vector control to supply power to the three-phase coil 100 of the three-phase motor 10 and control the operation of the three-phase motor 10. The control device 20 applies a pulse voltage to each coil end of the three-phase coil 100 to flow a current. The control device 20 includes a PI control unit 101, a driving unit 108, a position/velocity estimation unit 104, a change unit 109, and a current detection unit 107.

The driving unit 108 drives the U-phase coil 100a, the V-phase coil 100b, and the W-phase coil 100c of the three-phase coil 100 by PWM. The driving unit 108 includes a PWM control unit 102 and a switching unit 103. Based on an instruction from the PI control unit 101 to be described later, the PWM control unit 102 generates a U-phase control signal SU, a V-phase control signal SV, and a W-phase control signal SW by PWM and outputs them to the switching unit 103. The switching unit 103 turns on/off currents IU, IV, IW flowing through the U-phase coil 100a, the V-phase coil 100b, and the W-phase coil 100c of the three-phase coil 100 in accordance with the U-phase control signal SU, the V-phase control signal SV, and the W-phase control signal SW, respectively.

The current detection unit 107 detects the currents IU, IV, IW flowing through the U-phase coil 100a, the V-phase coil 100b, and the W-phase coil 100c, respectively, in a time-division manner.

The change unit 109 changes the sequence of detecting the currents flowing through the coils of the three-phase coil 100 in accordance with duties in the PWM. The change unit 109 includes a duty obtaining unit 105 and a sequence instruction unit 106.

The duty obtaining unit 105 obtains, from the PWM control unit 102, a U-phase duty DU as the duty of the U phase, a V-phase duty DV as the duty of the V phase, and a W-phase duty DW as the duty of the W phase.

The sequence instruction unit 106 sets the current detection sequence among the U-phase current IU, the V-phase current IV, and the W-phase current IW in the current detection unit 107 and operates the current detection unit 107 in the set sequence. The sequence instruction unit 106 holds a default sequence and a sequence change algorithm in a memory (not shown). In this embodiment, the default sequence is the order of the U-phase current IU, the V-phase current IV, and the W-phase current IW. The sequence change algorithm is an algorithm for setting a sequence according to the duties. According to the sequence change algorithm, for example, a current having a higher PWM duty is detected first. The sequence instruction unit 106 refers to a duty obtained by the duty obtaining unit 105 and if the duty exceeds a threshold, changes the sequence of detecting the current flowing through the coil from the default sequence to the sequence according to the sequence change algorithm. Otherwise, the sequence instruction unit 106 sets the sequence of detecting the current flowing through the coil to the default sequence. The sequence instruction unit 106 generates the sequence instruction unit 106 configured to control the sequence of detecting the current flowing through the coil and outputs it to the current detection unit 107.

The position/velocity estimation unit 104 estimates the electrical angle and velocity of the three-phase motor 10 from the U-phase current IU, the V-phase current IV, and the W-phase current IW detected by the current detection unit 107.

The PI control unit 101 performs PI (Proportional-Integral) control based on the electrical angle and velocity obtained by estimation in the position/velocity estimation unit 104.

Figure 4:
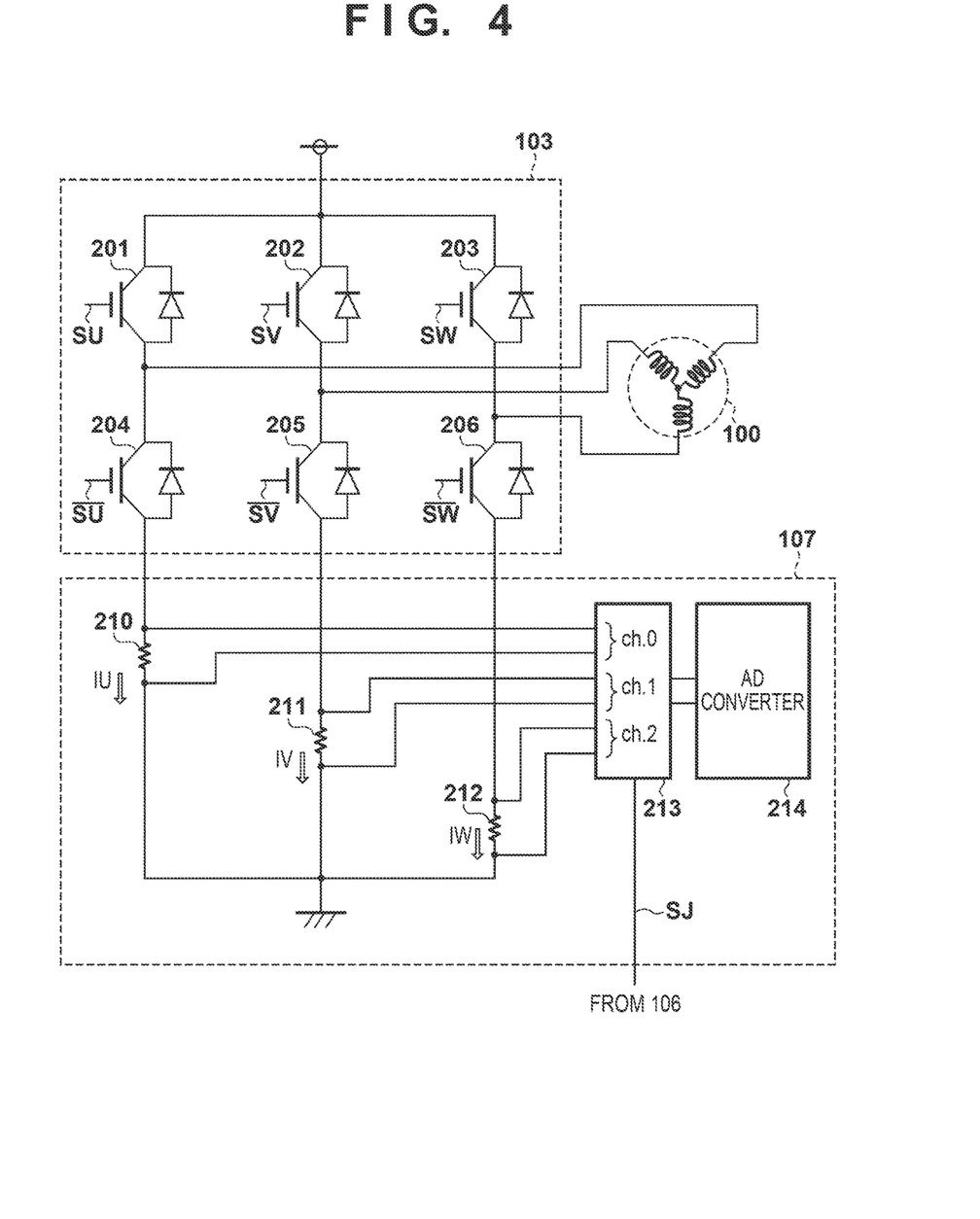
FIG. 4 is a circuit diagram showing the arrangements of a switching unit and a current detection unit in FIG. 3.

FIG. 4 is a circuit diagram showing the arrangements of the switching unit 103 and the current detection unit 107 in FIG. 3. The switching unit 103 includes a first FET 201 on the H side (high side) of the U phase, a fourth FET 204 on the L side of the U phase, a second FET 202 on the H side of the V phase, a fifth FET 205 on the L side of the V phase, a third FET 203 on the H side of the W phase, and a sixth FET 206 on the L side of the W phase and has a bridge configuration. The U-phase control signal SU is input to the control terminal (for example, the gate) of the first FET 201, and the first FET 201 is turned on/off in accordance with the U-phase control signal SU. For example, when the U-phase control signal SU is at high level, the first FET 201 is turned on. The V-phase control signal SV and the W-phase control signal SW are input to the control terminals of the second FET 202 and third FET 203, respectively. An inverted signal of the U-phase control signal SU is input to the control terminal of the fourth FET 204, and the fourth FET 204 is turned on/off in accordance with the U-phase control signal SU. For example, when the U-phase control signal SU is at low level, the fourth FET 204 is turned on. That is, the first FET 201 and the fourth FET 204 operate complementarily. An inverted signal of the V-phase control signal SV and an inverted signal of the W-phase control signal SW are input to the control terminals of the fifth FET 205 and sixth FET 206, respectively.

The current detection unit 107 includes a U-phase shunt resistor 210 to measure the U-phase current IU, a V-phase shunt resistor 211 to measure the V-phase current IV, a W-phase shunt resistor 212 to measure the W-phase current IW, a selector 213, and an A/D converter 214. The respective shunt resistors 210, 211, and 212 are provided in series between the GND (ground) and the FETs on the L sides of the corresponding phases. Each of the shunt resistors 210, 211, and 212 functions as a current-voltage conversion element that converts a current flowing through it into a voltage.

For example, regarding the U phase, when the fourth FET 204 is turned on at the same time when the first FET 201 is turned off after the first FET 201 is turned on, the U-phase current IU flows through the U-phase shunt resistor 210. Regarding the V phase, when the fifth FET 205 is turned on at the same time when the second FET 202 is turned off after the second FET 202 is turned on, the V-phase current IV flows through the V-phase shunt resistor 211. Regarding the W phase, when the sixth FET 206 is turned on at the same time when the third FET 203 is turned off after the third FET 203 is turned on, the W-phase current IW flows through the W-phase shunt resistor 212.

The selector 213 receives a U-phase detection voltage as a voltage drop of the U-phase shunt resistor 210 on channel 0 (ch.0), receives a V-phase detection voltage as a voltage drop of the V-phase shunt resistor 211 on channel 1 (ch.1), and receives a W-phase detection voltage as a voltage drop of the W-phase shunt resistor 212 on channel 2 (ch.2). The selector 213 receives a sequence instruction signal SJ output from the sequence instruction unit 106, selects one out of channels 0, 1, and 2 in accordance with the sequence instruction signal SJ, and outputs the selected detection voltage to the A/D converter 214.

The A/D converter 214 converts the detection voltages obtained from the U-phase shunt resistor 210, the V-phase shunt resistor 211, and the W-phase shunt resistor 212 into digital signals in a time-division manner. The A/D converter 214 converts the detection voltage selected by the selector 213 into a digital signal. The A/D converter 214 may be an external IC, or may be a built-in IP or macro such as a microcomputer or an ASIC. In this embodiment, only one A/D converter 214 is provided, and the A/D converter 214 is configured to be used in a time-division manner while changing channels 0, 1, and 2 in sequence. A value obtained by dividing a detected voltage value by a shunt resistor value becomes a current value.

The operation of the control device 20 with the above arrangement will be described.

Figure 5:
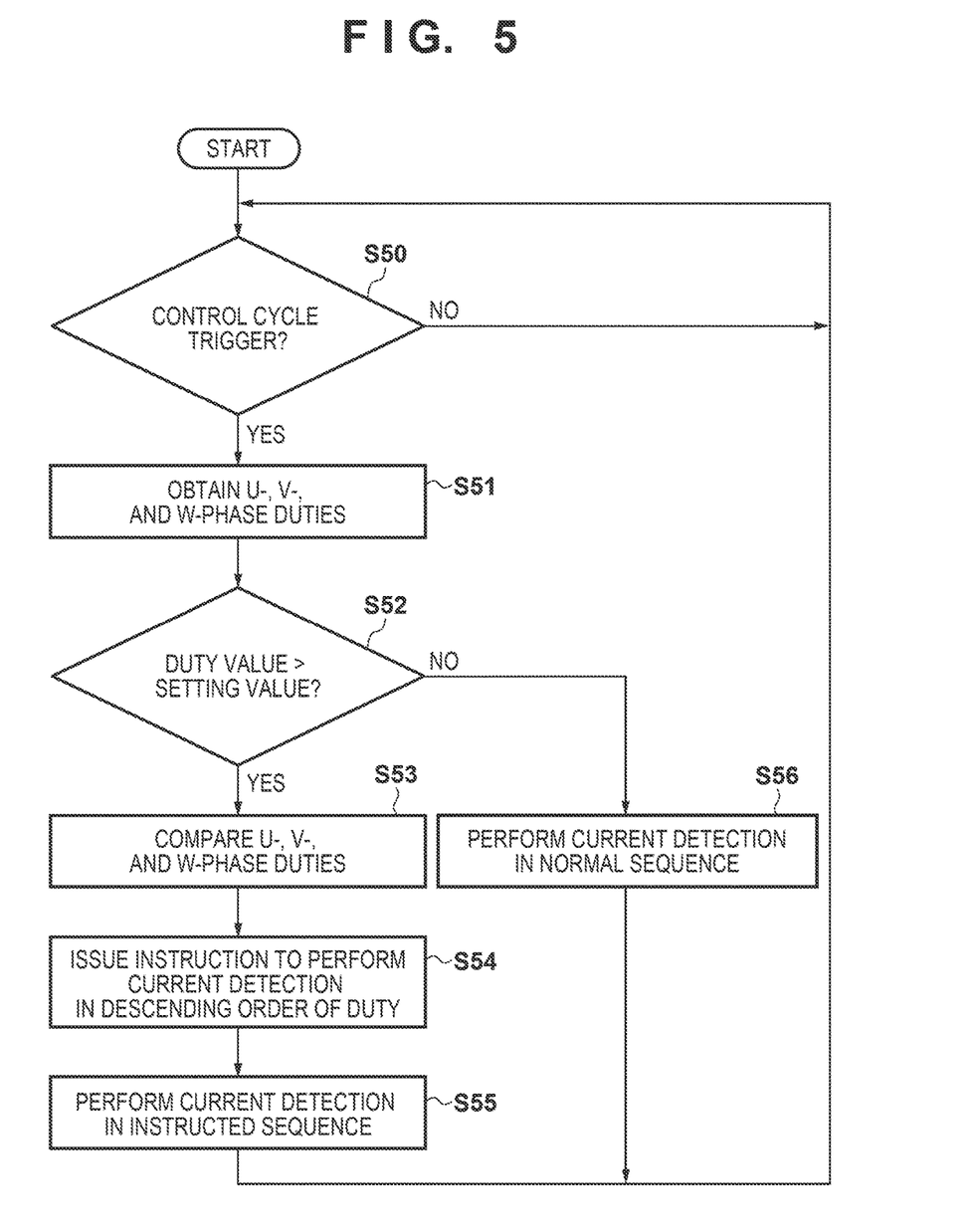
FIG. 5 is a flowchart showing the procedure of a series of processes in the control device of FIG. 3.

FIG. 5 is a flowchart showing the procedure of a series of processes in the control device 20 of FIG. 3. In step S50, the control device 20 measures a control cycle by an internal timer. In this embodiment, the control cycle is the PWM cycle TPWM. If one control cycle elapses, the process advances to step S51; otherwise, the process returns to step S50. In step S51, the duty obtaining unit 105 obtains the U-phase duty DU, the V-phase duty DV, and the W-phase duty DW. As a method of obtaining each duty, a method of detecting it from the counter value of the PWM counter for PWM control in the PWM control unit 102 or a method of receiving a notification about the duty value directly from the PWM control unit 102 may be used. In step S52, the sequence instruction unit 106 determines whether each duty obtained in step S51 is higher or lower than a setting value. If the duty is higher, the process advances to step S53. If the duty is lower, the process advances to step S56. Note that the setting value is a duty value set in advance by a register or the like. The setting value may be decided based on a duty in a case in which, for example, the length of a period from the start of A/D conversion to a change of the control signal for each phase to H level is (3×N) μs. By using this setting value, the sequence change algorithm can only be applied in a case in which a duty value higher than a certain value is obtained. Note that in another embodiment, an arrangement for skipping a conditional branching in step S52 and advancing to step S53 may be adopted. In step S53, the sequence instruction unit 106 compares the U-phase duty DU, the V-phase duty DV, and the W-phase duty DW. In step S54, based on a comparison result in step S53, the sequence instruction unit 106 instructs the current detection unit 107 to perform current detection in descending order of duty. For example, in a case in which the W-phase duty DW is the highest, the V-phase duty DV is the second highest, and the U-phase duty DU is the lowest, the sequence instruction unit 106 instructs, via the sequence instruction signal SJ, the current detection unit 107 to perform A/D conversion of the W phase first, A/D conversion of the V phase next, and A/D conversion of the U phase at last. Alternatively, the phase determined that its duty value is higher than the setting value in step S52 may be made as the highest duty, and a fixed (arbitrary) sequence may be used for the other phases. In step S55, the current detection unit 107 performs A/D conversion in the sequence instructed in step S54. In step S56, the current detection unit 107 performs A/D conversion in the same sequence as normal (default sequence).

Figure 6:
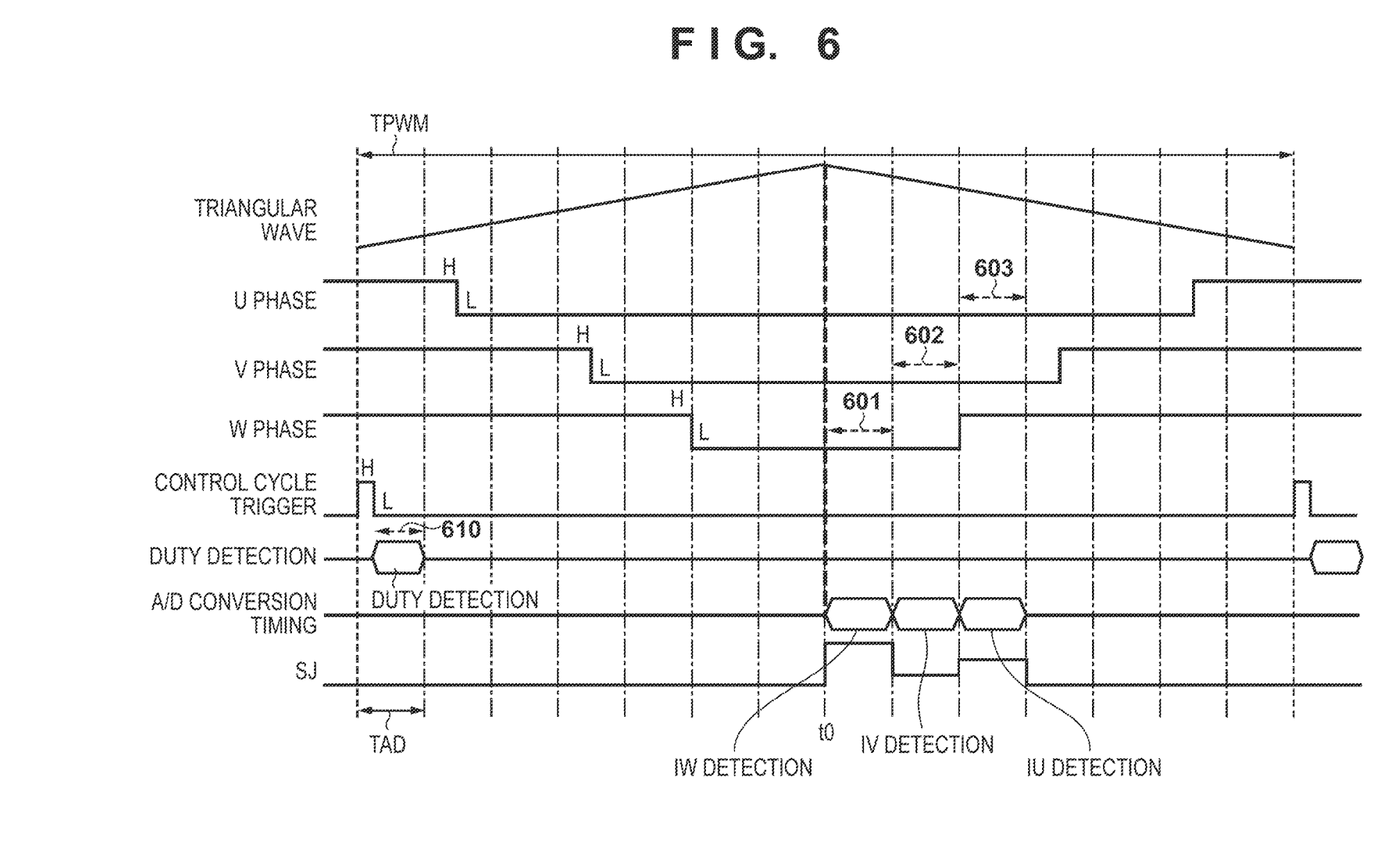
FIG. 6 is a timing chart showing a relationship between a period in which a current flows through each phase coil of a three-phase motor and a timing of conversion by an A/D converter according to the first embodiment.

FIG. 6 is a timing chart showing a relationship between a period in which a current flows through each phase coil of the three-phase motor 100 and a timing of conversion by the A/D converter 214 according to this embodiment. FIG. 6 shows that a malfunction is improved as compared to FIG. 2. In FIG. 6, a control cycle trigger signal generated by the duty obtaining unit 105 is a trigger signal set at H level by one cycle of a clock each time one control cycle (=PWM cycle TPWM) elapses. The duty obtaining unit 105 monitors this trigger signal and detects (reference numeral 610) the U-phase duty DU, the V-phase duty DV, and the W-phase duty DW if H level is detected. In an example of FIG. 6, the W-phase duty DW is the highest, and thus detection is performed in sequence of detection 601 of the W-phase current IW first, detection 602 of the V-phase current IV next, and detection 603 of the U-phase current IU at last. In FIG. 2, the W-phase current detection 403 falls outside the period 404 of the W phase at L level, that is, a period in which the sixth FET 206 is ON. In contrast, in FIG. 6, all of the detection 601 of the W-phase current IW, the detection 602 of the V-phase current IV, and the detection 603 of the U-phase current IU fall within periods at L level (periods in which the corresponding FETs are ON). Therefore, accurate current detection is performed. That is, while FIG. 2 has a restriction that the length of the period from the start of A/D conversion to the change of the control signal for each phase to H level is equal to or less than (3×N) μs, this can be relaxed to N μs in this embodiment.

According to the control device 20 according to this embodiment, it is possible, by performing current detection in descending order of PNM duty, to detect the currents accurately even if a switching pattern having a comparatively short ON time is generated.

In the control device 20 according to this embodiment, in order to relax a restriction on a timing for current detection, a shunt resistor dedicated for each phase is provided instead of sharing a shunt resistor among the phases. Furthermore, in the control device 20, a cost reduction is implemented by detecting the voltage drops of the three shunt resistors in a time-division manner with one A/D converter 214. In addition to these, in the control device 20 according to this embodiment, it is possible to relax a restriction on PWM by adjusting the current detection sequence in accordance with the PWM duties. This makes it possible to perform PWM driving at a higher frequency than before, that is, drive a motor at a rotation speed higher than before. It is also possible to provide vector control with good driving efficiency and a control device of a highly reliable motor.

The change unit 109 of the first embodiment changes the current detection sequence but does not change a PWM parameter. That is, it is possible to guarantee accuracy in current detection even without restricting the PWM driving pattern.

Note that in the first embodiment, a case has been described in which sensorless vector control of estimating the position and velocity of the motor from a current value is adopted. However, the present invention is not limited to this. The technical concept according to this embodiment can also be applied to a case in which, for example, vector control is performed using a sensor. In this case, a current detection result is used only for current control in the PI control unit 101.

A method of obtaining a threshold that requires changing the sequence of detecting the currents will be described with reference to FIG. 6. In FIG. 6, focusing on the W phase highest in duty in the waveforms of the respective phases used for PWM control, a period ½ (in order to start current detection from the time t0 corresponding to the peak of the triangular wave) of the low level period of this W phase is obtained as the threshold.

Whether to change the current detection sequence is determined by comparing this threshold with the total of current detection periods of the respective phases (401+402+403).

For ideal time to perform current detection, each phase starts the detection from the time t0. The start may slightly be deviated from the ideal time by changing the current detection sequence. It is therefore preferable not to change the current detection sequence if there is no need to change the sequence as compared with the threshold.

(Second Embodiment)

In the first embodiment, a case has been described in which the duty obtaining unit 105 obtains the duties from the PWM control unit 102. In the second embodiment, a phase of a voltage output to a three-phase coil 100 is classified for each sector, and the sequence of phases for detecting currents is changed for each sector.

Figure 7:
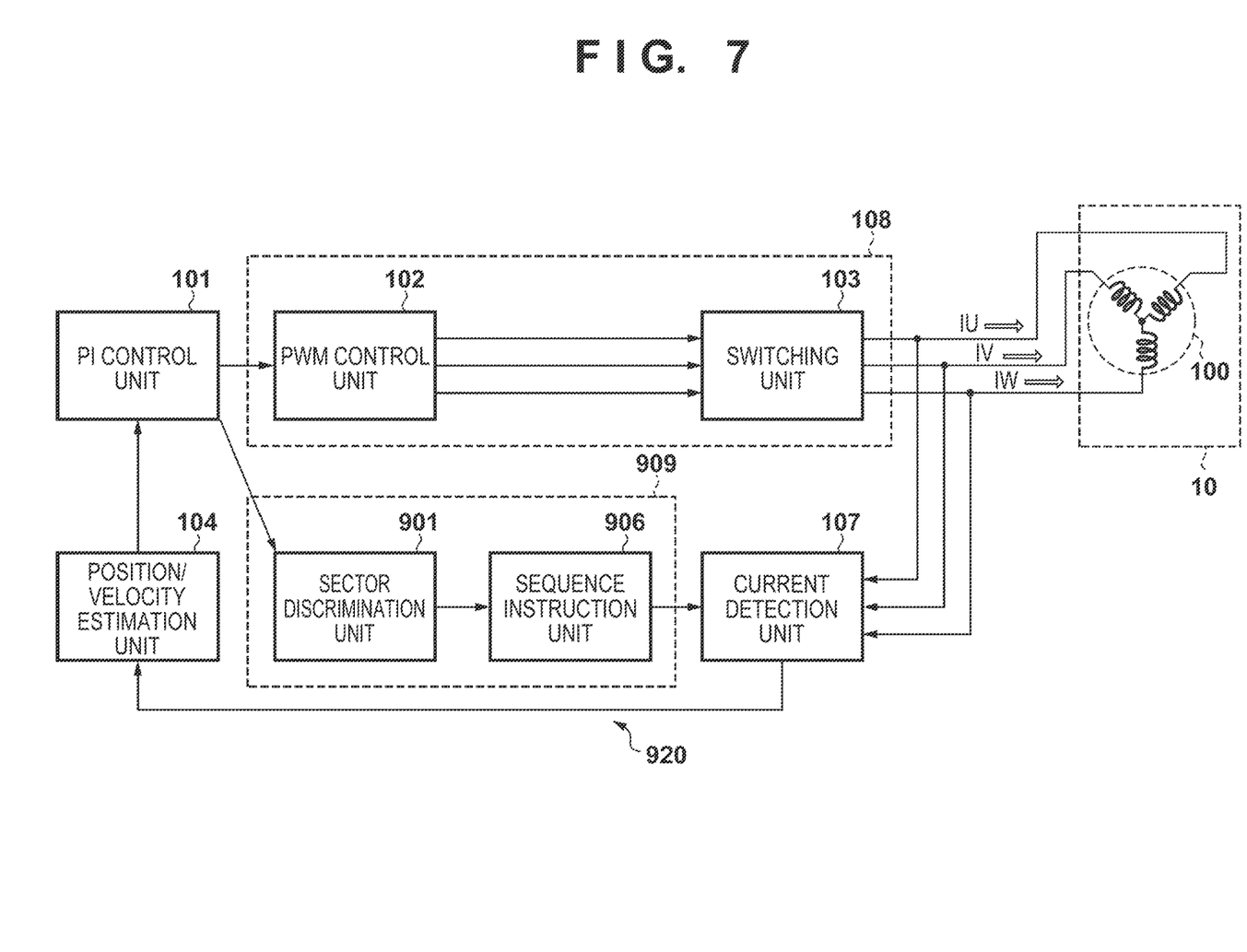
FIG. 7 is a block diagram showing the functions and arrangements of a control device and a three-phase motor controlled by it according to the second embodiment.

FIG. 7 is a block diagram showing the functions and arrangements of a control device 920 and a three-phase motor 10 controlled by it according to the second embodiment. The control device 920 includes a PI control unit 101, a driving unit 108, a current detection unit 107, a change unit 909, and a position/velocity estimation unit 104. The change unit 909 discriminates a sector based on a current detected by the current detection unit 107 and obtains a duty corresponding to the discriminated sector. In accordance with the thus obtained duty, the change unit 909 changes the current detection sequence in the current detection unit 107.

The change unit 909 includes a sector discrimination unit 901 and a sequence instruction unit 906. The sector discrimination unit 901 discriminates a current sector from information output by the PI control unit 101. The sequence instruction unit 906 obtains a magnitude relationship among duties corresponding to the sector obtained as a result of the discrimination by the sector discrimination unit 901. Based on the obtained magnitude relationship among the duties, the sequence instruction unit 906 decides the current detection sequence in the current detection unit 107.

The outline of SVM (Space Vector Modulation) will be described here. For the three-phase motor, there are eight combinations of ON/OFF of a three-phase input waveform (u, v, w) and its opposite phase waveform (x, y, z) in the cycle of pulse width modulation. However, six voltage vectors (100), (010), (001), (011), (101), and (110) except for 0 vectors (000) and (111) contribute to generation of a magnetic field. Each quadrant of these six voltage vectors will be referred to as a sector.

Figure 8:
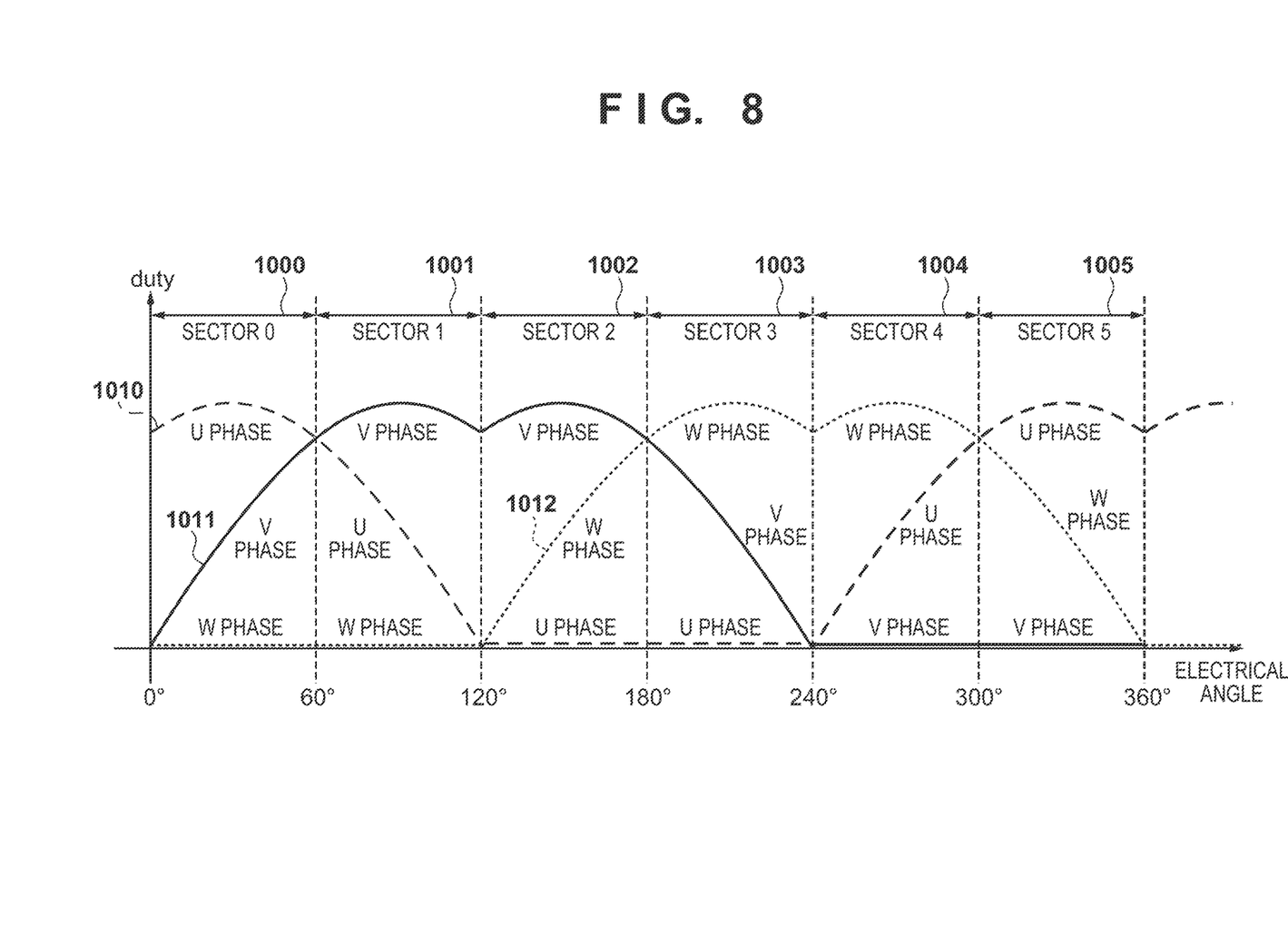
FIG. 8 is a graph showing duty values of respective phases for each sector.
Figure 10:
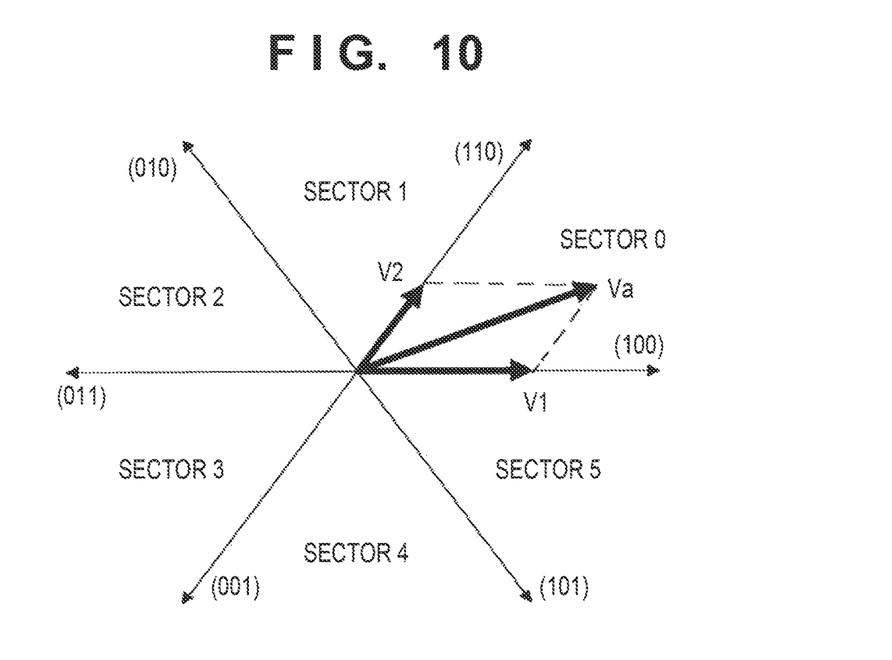
FIG. 10 is a view showing each sector in space vector modulation.

FIG. 10 is a view showing each sector in space vector modulation. Space vector modulation is control of fixing the instruction value of a phase having the lowest voltage out of voltage instruction values of the respective phases in pulse width modulation to 0 and performing conversion operations on the other phases such that each inter-phase voltage becomes a sine wave having phase shifting by 120°. FIG. 8 is a graph plotting a result of calculating this space vector modulation. That is, it becomes possible to obtain a sector as a current sector by obtaining a voltage vector at certain time in calculation of space vector modulation.

FIG. 8 is the graph showing duty values of the respective phases for each sector. A broken line 1010 indicates a U-phase duty, a solid line 1011 indicates a V-phase duty, and a dotted line 1012 indicates a W-phase duty, respectively. FIG. 8 shows an example in which control is performed such that the inter-phase voltage of the phases becomes the sine wave, and a waveform of each phase is shifted in phase by 120° with respect to waveforms of the other phases. In FIG. 8, the abscissa indicates an electrical angle, and a range of 0° to 60° represents sector 0, a range of 60° to 120° represents sector 1, a range of 120° to 180° represents sector 2, a range of 180° to 240° represents sector 3, a range of 240° to 300° represents sector 4, and a range of 300° to 360° represents sector 5. The ordinate indicates a duty value. For example, the arrangement of the phases in descending order of duty value in sector 0 has the order of the U phase, the V phase, and the W phase, and the arrangement of the phases in descending order of duty in sector 1 has the order of the V phase, the U phase, and the W phase. If the sectors are thus decided, a magnitude relationship among the duties is determined uniquely. In this embodiment, the magnitude relationship among the duties is determined by deciding the sectors.

As described above, because the magnitude relationship among the duties is determined uniquely for each sector, the magnitude relationship among the duties is known from the current sector even without comparing the magnitude relationship among the duties when the waveforms in pulse width modulation are output.

The operation of the control device 920 with the above arrangement will be described.

Figure 9:
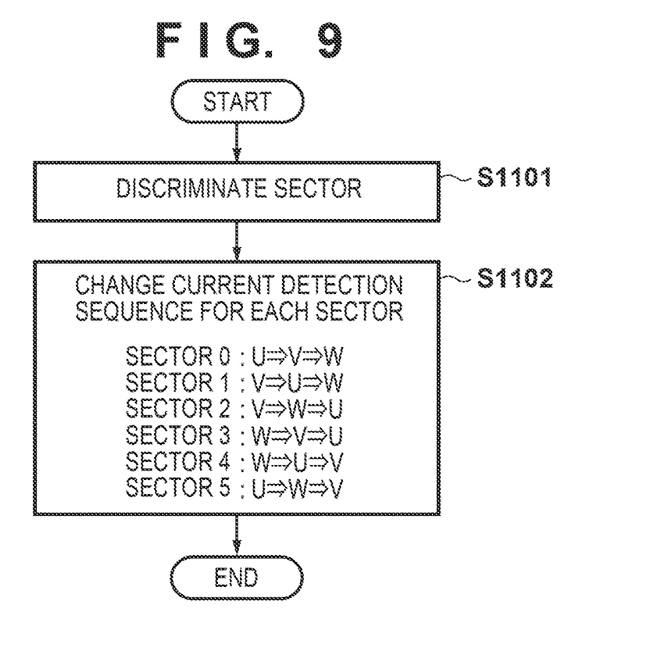
FIG. 9 is a flowchart showing the procedure of a series of processes in the control device of FIG. 7.

FIG. 9 is a flowchart showing the procedure of a series of processes in the control device 920 of FIG. 7. In step S1101, the sector discrimination unit 901 discriminates a sector as a current sector from a voltage output by the PI control unit 101. In step S1102, the sequence instruction unit 906 changes a current detection order for each sector as follows.

sector 0: U->V->W,
sector 1: V->U->W,
sector 2: V->W->U,
sector 3: W->V->U,
sector 4: W->U->V,
sector 5: U->W->V, When current detection is completed, the process returns to step S1101 to repeat the processes.

According to the control device 920 according to this embodiment, the same functional effect as a functional effect of the first embodiment is obtained. In addition, the control device 920 according to the second embodiment discriminates the sectors of the three-phase motor 10, changes the sequence of the phases for detecting the currents, and thus applicable to a case in which a duty is not obtained from a PWM control unit 102.

The arrangements and operations of the control devices according to the embodiments have been described above. These embodiments are merely examples, and those who are skilled in the art can understand that various modifications can be made as for the combination of the constituent elements or processes, and the modifications are also incorporated in the present invention.

In each of the first and second embodiments, a case has been described in which the three-phase motor 10 is to be controlled. However, the present invention is not limited to this. The technical concept according to the first or second embodiment can be applied to a multiple-phase motor, other than the three-phase motor, that uses PWM to detect the currents of the respective phases individually.

In each of the first and second embodiments, a case has been described in which the sequence change algorithm is applied if each duty exceeds the setting value. However, the present invention is not limited to this, and another predetermined condition other than the setting value may be used. For example, in an example in which a period when a current flows through a coil is longer as the duty is higher, the sequence change algorithm may be applied if the duty falls below the setting value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-038680, filed Mar. 1, 2017, which is hereby incorporated by reference herein in its entirety.

What is claimed is:

1. A control device, comprising:
    a driving unit configured to drive a plurality of coils of a multiple-phase motor by pulse width modulation;
    a detection unit configured to detect currents flowing through the plurality of coils in a time-division manner; and
    a change unit configured to change, in accordance with a duty in the pulse width modulation, a sequence of detecting the currents flowing through the plurality of coils by the detection unit, wherein if the duty in the pulse width modulation satisfies a predetermined condition, the change unit changes the sequence of detecting the currents flowing through the coils from a default sequence to the sequence according to the duty.

2. The device according to claim 1, wherein if the duty in the pulse width modulation exceeds a threshold, the change unit changes the sequence of detecting the currents flowing through the coils from the default sequence to the sequence according to the duty.

3. The device according to claim 1, wherein the sequence according to the duty is a sequence set such that a current higher in duty is detected first.

4. The device according to claim 3, wherein a period in which each current flows through a corresponding one of the coils becomes shorter as the duty in the pulse width modulation is higher, and
    if a length of the period in which the current flows through the coil falls below a threshold, the change unit changes the sequence of detecting the currents flowing through the coils from the default sequence to a sequence set such that a current shorter in period is detected first.

5. The device according to claim 1, wherein the detection unit starts a series of detection operations using a timing at which the currents flow through all the plurality of coils as a reference.

6. The device according to claim 1, wherein the detection unit includes
    a plurality of elements each configured to convert the current flowing through the corresponding one of the plurality of coils into a voltage, and
    an A/D converter configured to convert the voltages obtained from the plurality of elements into digital signals in a time-division manner, and
    the change unit changes a sequence of conversions into the digital signals by the A/D converter.

7. The device according to claim 6, wherein a cycle of the pulse width modulation is not more than 20 times a sampling cycle of the A/D converter.

8. The device according to claim 1, wherein the driving unit includes
    a switching unit configured to drive the plurality of coils by a plurality of switching elements turned on/off in accordance with a plurality of control signals, and a control unit configured to generate the plurality of control signals by the pulse width modulation, and the change unit obtains a duty in the pulse width modulation from the control unit.

9. The device according to claim 1, wherein the change unit discriminates a sector based on the currents detected by the detection unit and obtains a duty corresponding to the discriminated sector.

10. The device according to claim 1, wherein the multiple-phase motor is a three-phase motor.

11. The device according to claim 2, wherein the threshold is obtained based on a low level period of a phase highest in duty in pulse width modulation control.

12. The device according to claim 9, wherein the change unit obtains the sector based on a voltage instruction value for each phase in the pulse width modulation.

13. The device according to claim 12, wherein the change unit obtains the sector by space vector modulation.

14. The device according to claim 9, wherein the multiple-phase motor is a three-phase motor, and the sector is made of six combinations.

15. A control method, comprising:

driving a plurality of coils of a multiple-phase motor by pulse width modulation;

detecting currents flowing through the plurality of coils in a time-division manner; and changing, in accordance with a duty in the pulse width modulation, a sequence of detecting the currents flowing through the plurality of coils, wherein if the duty in the pulse width modulation satisfies a predetermined condition, changing the sequence of detecting the currents flowing through the coils from a default sequence to the sequence according to the duty.

\* \* \* \* \*